(12) United States Patent
Wang

(10) Patent No.: US 12,134,403 B2
(45) Date of Patent: Nov. 5, 2024

(54) VEHICLE, DRIVING ASSISTANCE DEVICE AND METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 265 days.

(21) Appl. No.: 17/690,127

(22) Filed: Mar. 9, 2022

(65) Prior Publication Data

US 2022/0289238 A1 Sep. 15, 2022

(30) Foreign Application Priority Data

Mar. 12, 2021 (CN) .......................... 202110270446.6

(51) Int. Cl.
*B60W 60/00* (2020.01)
*B60W 40/02* (2006.01)
*B60W 50/00* (2006.01)

(52) U.S. Cl.
CPC ........ *B60W 60/0011* (2020.02); *B60W 40/02* (2013.01); *B60W 50/0098* (2013.01);
(Continued)

(58) Field of Classification Search
CPC ............. B60W 40/02; B60W 50/0098; B60W 60/001; B60W 60/0011; B60W 60/0015;
(Continued)

(56) References Cited

U.S. PATENT DOCUMENTS 10,593,202 B1 * 3/2020 Christensen ........... G08G 1/161
10,685,310 B1 * 6/2020 McCuiston ........ G06Q 10/0637
(Continued)

FOREIGN PATENT DOCUMENTS

DE 102017204952 A1 9/2018

OTHER PUBLICATIONS

Nov. 18, 2022 European Search Report issued in corresponding EP Application No. 22161356.
Benoit Vanholme, "Highly Automated Driving on Highways Based on Legal Safety," IEEE Transactions on Intelligent Transportation Systems,, Mar. 2013.

*Primary Examiner* — Navid Z. Mehdizadeh
*Assistant Examiner* — Caitlin R McCleary
(74) *Attorney, Agent, or Firm* — Clements Bernard Walker; Christopher L. Bernard

(57) ABSTRACT

A driving assistance device for a vehicle includes an acquisition module configured to acquire information comprising at least one of vehicle state information and environment information surrounding the vehicle; a decision module configured to determine a driving behavior for the vehicle in an autonomous driving mode based on the acquired information; a pre-processing module configured to process the acquired information to identify a respective information category among a plurality of predefined information categories the acquired information belongs to; and a determining module configured to retrieve one or more traffic rules related to the information category the acquired information belongs to from a traffic rule database pre-stored in the driving assistance device; determine whether the driving behavior violates any of the retrieved traffic rules; and determine risks of said driving behavior if it is determined the driving behavior violates at least one of the retrieved traffic rules, said risks comprising one or more of the legal penalty, property damages and personal injury caused by the driving behavior.

15 Claims, 8 Drawing Sheets

(52) U.S. Cl.
CPC . *B60W 60/0015* (2020.02); *B60W 2050/0008* (2013.01); *B60W 2555/60* (2020.02); *B60W 2556/35* (2020.02)

(58) Field of Classification Search
CPC ......... B60W 60/0017; B60W 60/0059; B60W 2050/0008; B60W 2554/402; B60W 2554/404; B60W 2555/20; B60W 2555/60; B60W 2556/35; B60W 2556/45; B60W 2556/50; B60W 2556/55
See application file for complete search history.

(56) References Cited

U.S. PATENT DOCUMENTS

| | | | |
|---|---|---|---|
| 2016/0001775 A1* | 1/2016 | Wilhelm | B60W 30/085 |
| | | | 701/25 |
| 2017/0212525 A1* | 7/2017 | Wang | B60W 50/14 |
| 2017/0282915 A1* | 10/2017 | Kim | B60W 50/14 |
| 2018/0164808 A1* | 6/2018 | Prokhorov | B60W 10/18 |
| 2018/0326977 A1* | 11/2018 | Klarner | B60W 60/0016 |
| 2019/0079990 A1* | 3/2019 | Herman | G06F 16/285 |
| 2019/0276012 A1 | 9/2019 | Zhu et al. | |
| 2019/0377352 A1* | 12/2019 | Weisswange | B60W 60/0027 |
| 2021/0103772 A1* | 4/2021 | Skaljin | G06F 18/214 |

\* cited by examiner

VEHICLE, DRIVING ASSISTANCE DEVICE AND METHOD

CROSS-REFERENCE TO RELATED APPLICATION

The present disclosure claims the benefit of priority of co-pending Chinese Patent Application No. CN 202110270446.6, filed on Mar. 12, 2021, and entitled "Driving Assistance Device, System and Method for Vehicle," the contents of which are incorporated in full by reference herein.

TECHNICAL FIELD

The disclosure relates to the technical field of vehicle driving assistance, in particular to a driving assistance device and method and a vehicle including the driving assistance device.

BACKGROUND

The driving assistance technology is a research hotspot and an important research direction of the automobile industry. In the prior art, there have been studies on various aspects of a driving assistance system. The autonomous driving (self-driving) behaviors of the vehicle should conform to the traffic rules (the traffic laws), especially when a vehicle equipped with a driving assistance system drives in an autonomous driving mode.

In a prior art solution, the driving assistance system detects whether a self-driving vehicle violates any of the traffic rules, and sends the detected result that the self-driving vehicle violates one or more traffic rules to a back-end server or traffic control department. In another prior art solution, driving assistance system compares detected driving behaviors of a self-driving vehicle with standard driving behaviors defined by the traffic rules, and intervenes the self-driving of the vehicle if the detected driving behaviors deviate from the standard driving behaviors.

It is seen the prior art solutions mainly focus on judging whether a driving behavior of a self-driving vehicle violates any traffic rule. However, the prior art solutions cannot solve the problem of how to minimize the risk of the autonomous driving behavior if a violation of traffic rules cannot be avoided.

SUMMARY

According to one aspect of the disclosure, a driving assistance device for a vehicle is provided. The driving assistance device includes: an acquisition module configured to acquire information comprising at least one of vehicle state information and environment information surrounding the vehicle; a decision module configured to determine a driving behavior for the vehicle in an autonomous driving mode based on the acquired information; a pre-processing module configured to process the acquired information to identify a respective information category among a plurality of pre-defined information categories the acquired information belongs to; and a determining module configured to retrieve one or more traffic rules related to the information category the acquired information belongs to from a traffic rule database pre-stored in the driving assistance device; determine whether the driving behavior violates any of the retrieved traffic rules; and determine risks of said driving behavior if it is determined the driving behavior violates at least one of the retrieved traffic rules, said risks comprising one or more of the legal penalty, property damages and personal injury caused by the driving behavior.

According to another aspect of the disclosure, a vehicle. The vehicle includes: a communication interface configured to receive information on the vehicle's states, environmental conditions and traffic rules from an external device; an on-board sensing unit for capture information on the vehicle's surroundings and states; and a driving assistance device in communication with the communication interface and the in-vehicle sensing unit, the driving assistance device including: an acquisition module configured to acquire information from the communication interface and the in-vehicle sensing unit; a decision module configured to determine a driving behavior for the vehicle in an autonomous driving mode based on the acquired information; a pre-processing module configured to process the acquired information to identify a respective information category among a plurality of pre-defined information categories the acquired information belongs to; and a determining module configured to retrieve one or more traffic rules related to the information category the acquired information belongs to from a traffic rule database pre-stored in the driving assistance device; determine whether the driving behavior violates any of the retrieved traffic rules; and determine risks of said driving behavior if it is determined the driving behavior violates at least one of the retrieved traffic rules, said risks comprising one or more of the legal penalty, property damages and personal injury caused by the driving behavior.

According to yet another aspect of the disclosure, a driving assistance method for a vehicle is provide. The driving assistance method includes the steps of: acquiring information including at least one of vehicle state information and environment information surrounding the vehicle; determining a driving behavior for the vehicle in an autonomous driving mode based on the acquired information; processing the acquired information to obtain a respective information category among a plurality of pre-defined information categories the acquired information belongs to; retrieving one or more traffic rules related to the information category the acquired information belongs to from a traffic rule database pre-stored in the driving assistance device; determining whether the driving behavior violates any of the retrieved traffic rules; and determining risks of the driving behavior if it is determined the driving behavior violates at least one of the retrieved traffic rules, said risks comprising one or more of the legal penalty, property damages and personal injury caused by the driving behavior.

According to yet another aspect of the disclosure, a non-transitory computer-readable medium with instructions stored therein which, when executed, cause one or more processors to carry out the steps including: acquiring information including at least one of vehicle state information and environment information surrounding the vehicle; determining a driving behavior for the vehicle in an autonomous driving mode based on the acquired information; processing the acquired information to obtain a respective information category among a plurality of pre-defined information categories the acquired information belongs to; retrieving one or more traffic rules related to the information category the acquired information belongs to from a traffic rule database pre-stored in the driving assistance device; determining whether the driving behavior violates any of the retrieved traffic rules; and determining risks of the driving behavior if it is determined the driving behavior violates at least one of the retrieved traffic rules, said risks comprising one or more of the legal penalty, property damages and personal injury caused by the driving behavior.

BRIEF DESCRIPTION OF THE DRAWINGS

The disclosed aspects will hereinafter be described in connection with the appended drawings that are provided to illustrate and not to limit the scope of the disclosure.

DETAILED DESCRIPTION

Figure 1A:
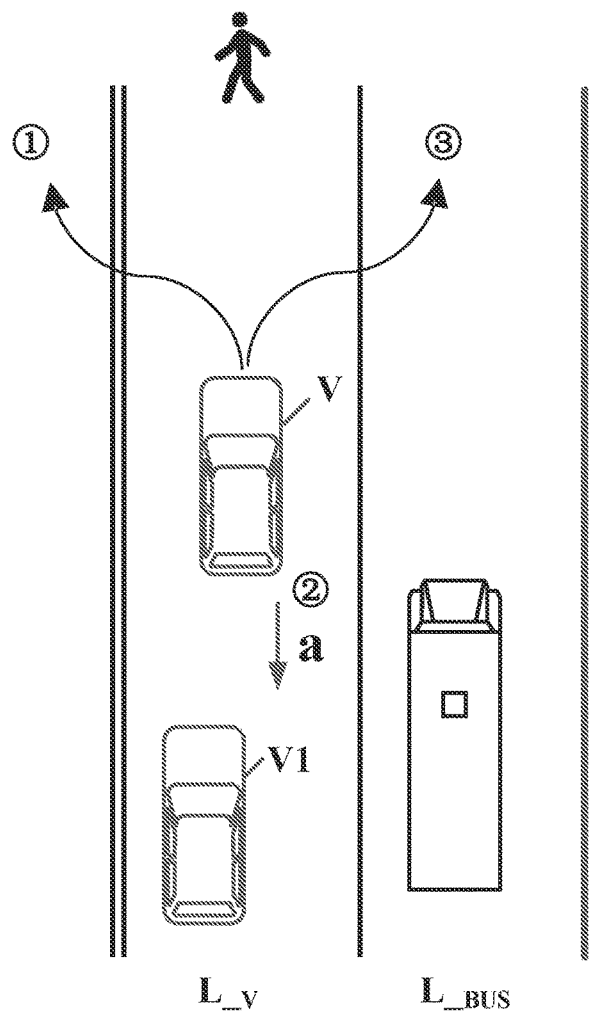
FIG. 1A schematically illustrates an exemplary traffic environment in which an embodiment of the disclosure can be implemented.

FIG. 1A schematically illustrates an exemplary traffic environment in which an embodiment of the disclosure can be implemented. Referring to FIG. 1A, a vehicle V is driving in an autonomous driving mode in the driving lane L_v, and suddenly a pedestrian appears in front of the vehicle V. At this time, the vehicle V has three options, namely, (1) turning left which will result in a double solid line violation; (2) braking to avoid hitting the pedestrian which will cause a collision with the vehicle behind (i.e., the vehicle V1); (3) turning right which will result in encroaching onto a bus Lane L_BUS.

Figure 1B:
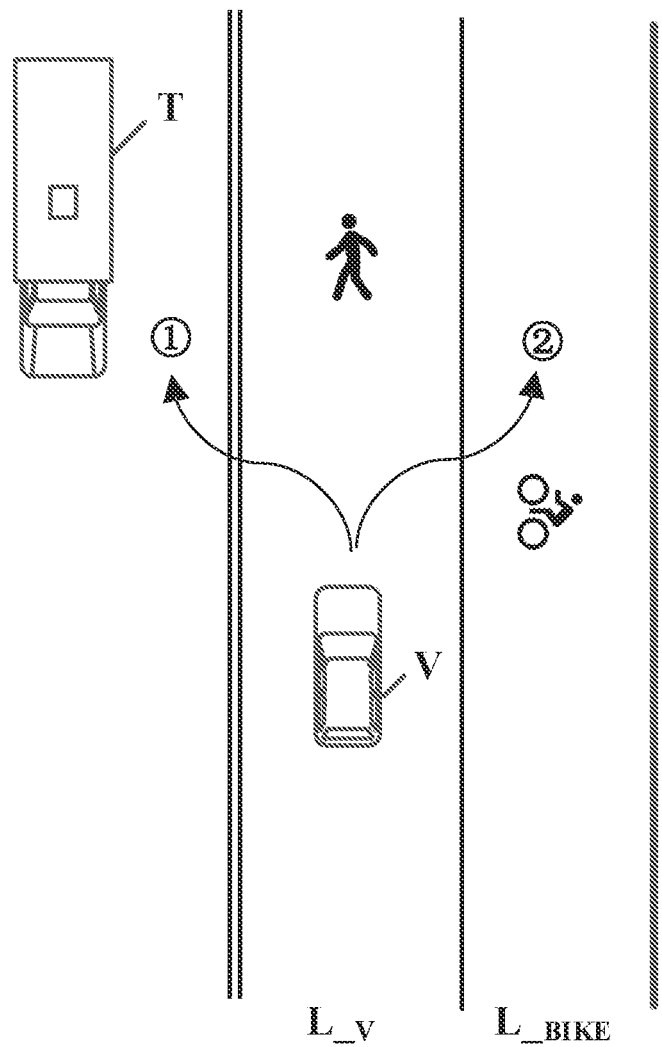
FIG. 1B schematically illustrates another exemplary traffic environment in which an embodiment of the disclosure can be implemented.

FIG. 1B schematically illustrates another exemplary traffic environment in which an embodiment of the present disclosure can be implemented. Referring to FIG. 1B, the vehicle V in an autonomous driving mode is driving in the driving lane L_v, and suddenly a pedestrian appears in front of the vehicle V. At this time, vehicle V has three options, namely, (1) turning left which will result in entering a reverse lane on the left which may result in a collision with an coming truck T; (2) turning right which will result in entering a non-motorized lane L_BIKE on the right which may result in a collision with cyclists on the non-motorized lane; (3) emergency braking which will result in colliding with the pedestrian.

When a vehicle is in an autonomous driving mode and is travelling in a traffic environment such as FIG. 1A or FIG. 1B, by employing the technical solution according to an example of the present disclosure, an optimized self-driving strategy can be provided for the vehicle by means of the technical solution according to an embodiment of the disclosure. Specifically, the technical solution of the present disclosure provides such a driving assistance strategy that an optimized decision on a driving behavior can be made in an autonomous driving mode based on risks on legal penalty, property damages and personal injury, in particular when a violation of traffic rules cannot be avoided. In contrast, solutions in the prior art only detect vehicle behaviors and judge whether the vehicle behaviors violate any traffic rule without providing a strategy to reduce the risks and resulting damages.

In an embodiment of the disclosure, a closed-loop control is performed and concluded when a stable decision on a driving behavior is output. According to an embodiment of the disclosure, it improves the vehicle's ability to recognize traffic rules, and it also contributes to make an optimal decision on a driving behavior. In the case that a violation of at least one traffic rule cannot be avoided, the violation is measured by the degrees of risks on legal penalty, property damages and personal injury and thus the negative impact caused by the violation can be measured and then minimized.

In the disclosure, a "traffic rule" or one or more "traffic rules" or "information on traffic rules" includes: a legal regulation of a driving behavior of a vehicle; a penalty criterion for a violation of traffic rules. The legal regulations pertain to, for example, traffic signals, speed limits, lane attributes (e.g., a passable direction, a bus exclusive lane, a passable time period, etc.), lane boundary attributes (e.g., whether a vehicle can cross the lane boundary and change the lane, whether a vehicle can change the vehicle lane and overtake, etc.), etc. The penalty criterion includes, for example, a legal penalty and property damage claims for a traffic violation.

In the disclosure, a "traffic rule" or one or more "traffic rules" or "information on traffic rules" includes traffic laws and regulations for human drivers, considering that a self-driving vehicle may get involved in traffic where human-driving vehicles also exist.

In the disclosure, a "traffic rule" or one or more "traffic rules" or "information on traffic rules" may include traffic laws and regulations for self-driving vehicles (AV: autonomous vehicles), such as traffic laws and regulations specified for different levels of autonomous driving (e.g., semi-autonomous driving, highly autonomous driving and fully autonomous driving).

Considering that different areas (e.g. state, city, town, county, district) or countries may have special traffic laws and regulations of their own and that a road section may have temporary traffic regulations, the traffic rule(s) of the disclosure include those specified for the area or country in which the vehicle is currently travelling and those specified for the road section on which the vehicle is currently travelling.

In the disclosure, a "traffic rule", or one or more "traffic rules" or "information on traffic rules" may include dynamic updates of the traffic rules. The dynamic updates, for example, include the updates and changes on the legal regulation and penalty criterion when the vehicle goes to a different location (e.g., the vehicle is driving in San Francisco one week and then New York the next week, the relevant traffic rules will be updated for the vehicle), and also includes updates on a legal regulation and penalty criterion that change overtime. It also includes any newly enacted laws and regulations pertaining to autonomous driving. For example, with the developments of artificial intelligence and law, there may be new laws and regulations taken into force for autonomous driving.

In the disclosure, "autonomous mode" or "autonomous driving" may include different levels of autonomous driving, such as semi-autonomous driving, highly autonomous driving and fully autonomous driving.

Figure 2:
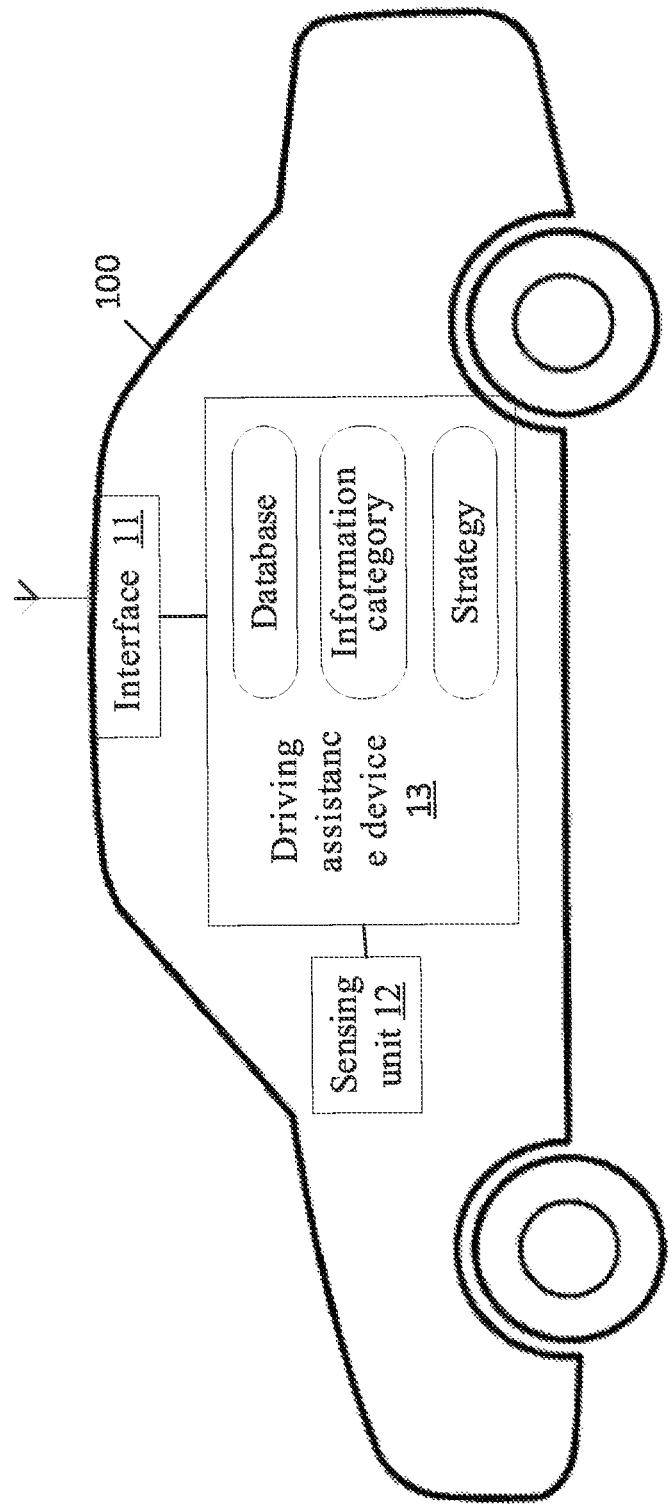
FIG. 2 shows a vehicle according to an embodiment of the disclosure.

FIG. 2 shows a vehicle 100 according to an embodiment of the disclosure. The vehicle 100 is equipped with a driving assistance system and thus has an autonomous driving function. The vehicle 100 can switch between a human driver mode and an autonomous mode.

The vehicle 100 is configured with various levels of autonomous driving capabilities facilitated by in-vehicle computing systems with logic implemented in hardware, firmware, and/or software to enable autonomous driving functions. Such autonomous driving functions may allow vehicles to self-control or provide driver assistance to detect roadways, navigate from one point to another, detect other vehicles and traffic participants (e.g., pedestrians, bicyclists, etc.), detect obstacles and hazards and road conditions (e.g., traffic, road conditions, weather conditions, etc.), and adjust control and guidance of the vehicle accordingly. In the disclosure, a "vehicle" may be a manned vehicle designed to carry one or more human passengers (e.g., cars, trucks, vans, buses, motorcycles, trains, aerial transport vehicles, ambulance, etc.), an unmanned vehicle to drive with or without human passengers (e.g., freight vehicles (e.g., trucks, rail-based vehicles, etc.)), vehicles for transporting non-human passengers (e.g., livestock transports, etc.). The vehicle may be a special service vehicle for collecting information of the driving environment, providing assistance for autonomous driving of other vehicles, performing road maintenance tasks, providing industrial tasks or providing public safety and emergency response tasks, etc.

As shown in FIG. 2, the driving assistance system is provided on/in the vehicle 100, and can also be referred to as an in-vehicle system. The driving assistance system includes a communication interface 11, a sensing unit 12, and a driving assistance device 13.

The communication interface 11 is configured to wirelessly communicate with an external device. In other words, the vehicle 100 can exchange information with the external device via the communication interface 11 by suitable wireless communication means such as 3G/4G/5G, C-V2X, DSRC, Wi-Fi or Bluetooth. The external device includes a device that is not an integral part of the vehicle 100. The external device is, for example, a cloud server that communicates with the vehicle 100 via a wireless network, an edge server that communicates with the vehicle 100 via a wireless network, a roadside facility that communicates with the vehicle 100 via a C-V2X module, another vehicle that is configured to wirelessly communicate with the vehicle 100, an electronic device that is configured to wirelessly communicate with the vehicle 100 (e.g. a smartphone carried by a pedestrian close by).

The information received from the external device via the communication interface 11 and detected by the on-board sensing unit 12 will be processed in the driving assistance device 13. The information may include: information on environmental conditions, vehicle states, map and navigation, and traffic rules.

Information on Environmental Conditions (Environmental Information)

The environmental information may include state information of an object around the vehicle 100, particularly state information of an object that may collide with the vehicle 100. The state information of the object may include the type of the object (e.g. an obstacle, a pedestrian, a pet or another vehicle), the state of the object (e.g. being stationary or moving, moving speed or direction), the position of the object (e.g. an absolute position (such as GNSS, GPS position) or a relative position to a reference position (such as the distance to a traffic light), and the size of the object.

The environmental information includes climate and weather information.

The climate and weather information may include features representing weather conditions such as fog, hail, cloudy days, rain, visibility, lighting and rainfall.

The environmental information includes scene information. The scene information may include features representing various scenes such as highway, intersection and single-lane. The features representing various scenes may be obtained by semantic recognition (e.g. intelligent semantic recognition realized by means of AI technology) of the environmental information, such as road signs and traffic signs.

Information on Vehicle States (Vehicle State Information)

The vehicle state information may include features representing various states of the vehicle such as traveling direction, speed, acceleration, currently travelling lane and motion trajectory.

Information on Map and Navigation

The information on map and navigation includes map data and a navigation route containing the road section in which the vehicle is travelling. This information can be automatically transmitted to the vehicle from the external device based on the location information of the vehicle, or may be transmitted to the vehicle from the external device in response to a request from the vehicle to the external device.

The aforementioned information may be collected by the external device and processed in the external device, and then the processed information is sent to the vehicle 100 from a wireless communication unit of the external device. This is advantageous as it reduces the amount of computation in the driving assistance device 13 and also reduces the required computational capacity of the driving assistance device 13.

Information on Traffic Rules (Traffic Rule Information)

The information on traffic rules includes traffic rules for both human-drivers and for autonomous vehicles as well as penalty criteria for traffic violations. This information may include static traffic rules, dynamic traffic rules and temporary traffic rules.

The "static" traffic rules can be understood as the rules that are not expected to change over time. The static traffic rules can be obtained from the external device. For example, the static traffic rules can include traffic rules that are documented in a traffic rule manual/guide.

The "dynamic" traffic rules can be understood as the rules that change over time. For example, the dynamic traffic rules can include newly enacted traffic rules that are updated and taken into force along with the developments of artificial intelligence and law (AI Law). These updated traffic rules can be stored in a cloud server and downloaded to the vehicle.

The "temporary" traffic rules may include the traffic rules instantly detected by an in-vehicle sensor (such as a dashboard camera) and/or a road-side sensor that are inconsistent with or missing from the static traffic rules. For example, a road segment in which the vehicle 100 is travelling is being repaired, a roadblock is set, and a different speed limit is specified. In this case, the different speed limit belongs to a temporary traffic rule. In addition, the vehicle 100 may send the detected speed limit to the external device (e.g. uploading to a cloud server). Then, the speed limit can be sent to vehicles passing by this road segment.

It is seen that the vehicle 100 can both receive traffic rules from the external device and detect traffic rules temporarily specified for the road section on which it is travelling. In this way, the traffic rules to be processed in the driving assistance device 13 fully capture the traffic rules set for the currently travelling position.

In an example, the traffic rules are pre-processed in the pre-processing module of the driving assistance device 13 or in a processor of the external device. The pre-processing may include semantic recognition (e.g. natural language semantic recognition) of the traffic rules to retrieve information of interest (i.e., one or more traffic rules) from a vast amount of traffic rules in the database. The pre-processing can further include adding tags/labels indicating elements of interest to the traffic rules. The pre-processing can be implemented using an AI model (artificial intelligence model) such as a trained neural network model.

Such a pre-processing step is advantageous because useful information can be quickly and unambiguously retrieved from a vast amount of information without a time-consuming step of going through all the traffic rules one by one. Examples of the pre-processing step are described below.

In an example, pre-processing includes adding tags or labels corresponding to category-based keywords to traffic rules. In this example, the pre-processed traffic rules include such tags or labels. The category-based keywords are the keywords classified based on various categories. The categories may include a driving behavior category, a driving scene category, a climate and weather category, an object state category and a violation category.

Keywords related with the driving scene category may include keywords such as "high way", "tunnel", and "elevated-highway". Keywords related with the climate and weather category may include keywords such as "visibility", "light intensity" and "amount of rain". Keywords related with the driving behavior category may include keywords such as "vehicle speed" and "travelling direction". Keywords belong to the object state category may include keywords such as "the object having a likelihood of collision with the vehicle".

In addition, one or more of the categories may have sub-categories. For example, the driving scene category includes sub-categories such as high way, one-way street and tunnel. Those sub-categories provide a more detailed classification of the traffic rules, thereby greatly improving the efficiency of retrieving traffic rules.

In another example, pre-processing includes processing traffic rules to include different combinations of driving behaviors, driving scenes, weather and climate and object states. For example, each combination includes a driving behavior as well as a penalty criterion for the driving behavior, and also includes one or more of a driving scene, weather and climate and an object state.

In yet another example, pre-processing includes logically processing traffic rules such that each traffic rule includes two kinds of elements, namely, a condition element and a result element. The condition element may involve a driving behavior and a scene in which the driving behavior occurs. The result element may involve a penalty rule for the driving behavior. The condition element is, for example, "if a driving behavior of a vehicle is triggered (happens) in a certain scenario". The result element is, for example, "the vehicle should take 100% responsibility and pay a fine". For clarity, an exemplary logical rule could be described as "if a vehicle is traveling in an autonomous driving mode in a geofence area and the vehicle speed exceeds 80 km/h, this behavior of the vehicle is illegal and a fine should be paid".

The sensing unit 12 is provided on/in the vehicle 100, and could be referred to as an in-vehicle sensing unit. The information detected by the sensing unit 12 is transmitted to the driving assistance device 13 via a vehicle bus.

The sensing unit 12 may include one or more environmental sensors for capturing environmental information. The one or more environmental sensors may include one or more camera sensors (e.g. at least one of a single-target camera, a multi-target camera and a panoramic camera) and/or one or more radar sensors (e.g. at least one of a lidar, an ultrasonic radar and a millimeter-wave radar). In an example, two or more environmental sensors may be arranged at different positions of the vehicle body, and this arrangement ensures safety redundancy, that is, ensures the environmental conditions around the vehicle can be adequately detected.

The sensing unit 12 may further include one or more vehicle state sensors for detecting vehicle state information. The vehicle state sensors may directly or indirectly measure vehicle state parameters. The one or more vehicle state sensors may include at least one of a wheel speed sensor, a displacement sensor, an acceleration sensor, and a steering angle sensor.

The driving assistance device 13 is communicatively connected with the communication interface 11 and the sensing unit 12, respectively. A traffic rule database and a plurality of information categories are pre-stored in the driving assistance device 13. The information received via the communication interface 11 and detected by the in-vehicle sensor is classified into respective categories to be further processed in the driving assistance device 13.

The driving assistance device 13 is configured to acquire information including vehicle state information and/or environment information surrounding the vehicle; make a decision on a driving behavior for the vehicle in an autonomous driving mode based on the acquired information; process the acquired information to obtain a respective information category among a plurality of pre-defined information categories the acquired information belongs to; retrieve one or more traffic rules related to the information category the acquired information belongs to from a traffic rule database pre-stored in the driving assistance device; determine whether the driving behavior violates any of the retrieved traffic rules; and determine risks on legal penalty, property damages and personal injury caused by the driving behavior if it is determined the driving behavior violates at least one of the retrieved traffic rules.

In an example, the driving assistance device is further configured to perform a closed-loop control with the determined risks on legal penalty, property damages and personal injury as feedback parameters and the closed-loop control is ended when the decision module outputs a stable decision. The closed-loop control includes steps (a) and (b) performed sequentially, the steps being repeated until the decision module outputs the stable decision. In step (a), the determining module outputs the determined risks of the driving behavior to the decision module. In step (b), the decision module makes a decision on a new driving behavior based on the determined risks, and outputs the decision on the new driving behavior to the determining module.

The driving assistance device 13 may be provided in an ECU, a VCU or a domain controller of the vehicle 100.

The driving assistance device 13 may be implemented by means of hardware or software or a combination of hardware and software, including a non-transitory computer-readable medium stored in a memory and implemented as instructions executed by a processor. Regarding the part implemented by means of hardware, it may be implemented in application-specific integrated circuit (ASIC), digital signal processor (DSP), data signal processing device (DSPD), programmable logic device (PLD), field programmable gate array (FPGA), processor, controller, microcontroller, microprocessor, electronic unit, or a combination thereof. The part implemented by software may include microcode, program code or code segments. The software may be stored in a machine-readable storage medium, such as a memory.

In an example, the driving assistance device 13 may include a memory and a processor. The traffic rule database, the plurality of information categories and instructions are stored in the memory. The instructions, when executed by the processor, cause the processor to execute the driving assistance strategy/method of the present disclosure.

Figure 3:
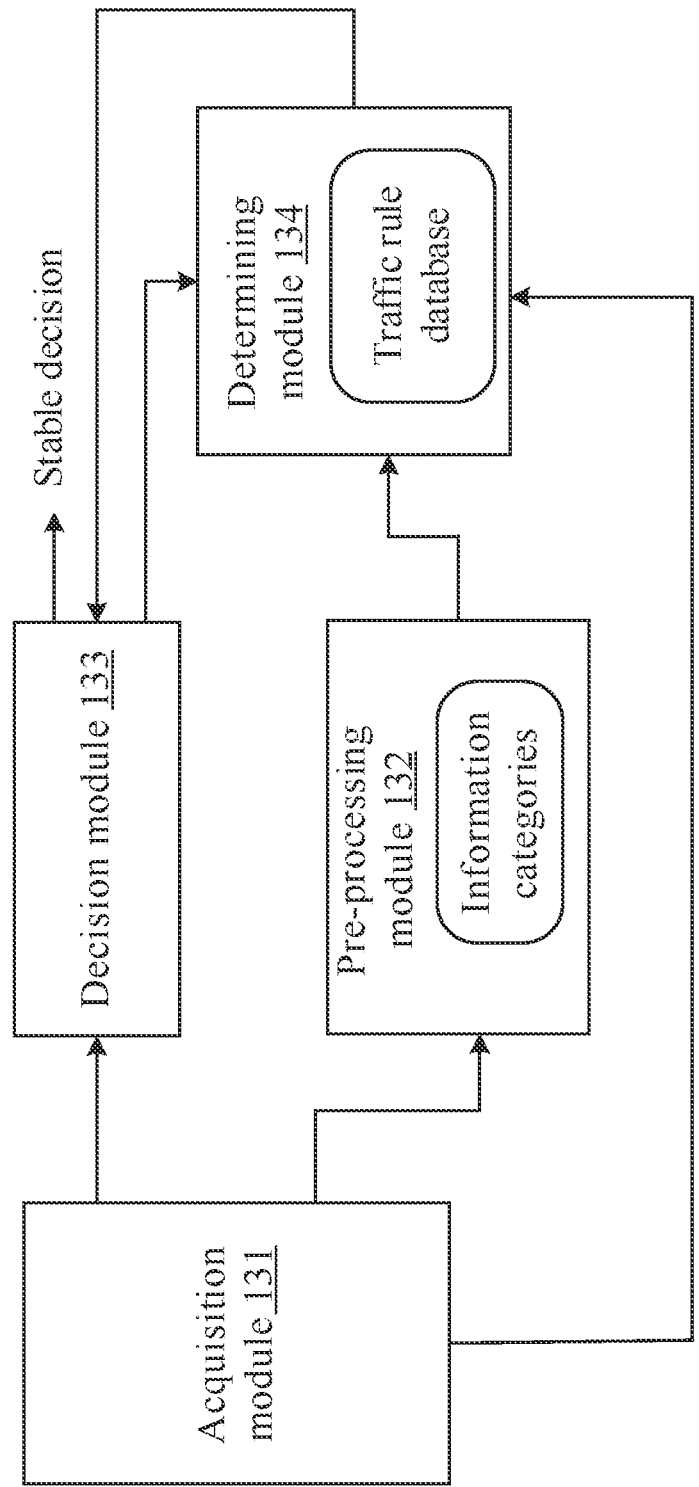
FIG. 3 shows a driving assistance device according to an embodiment of the disclosure.

FIG. 3 shows a schematic block diagram of a driving assistance device 13 according to an embodiment of the disclosure. As shown in FIG. 3, the driving assistance device 13 includes an acquisition module 131, a pre-processing module 132, a decision module 133, and a determining module 134. In an example, the information categories are pre-stored in the pre-processing module 132 and the traffic rule database is pre-stored in the determining module 134.

It is noted that the driving assistance device 13 and its modules are named functionally (logically) and their physical positions are not limited by their functional names. In other words, the modules may be included in the same chip or circuit. The modules may also be provided in different chips or circuits. One or more of these modules may also be further functionally divided into sub-modules or combined together.

Figure 4:
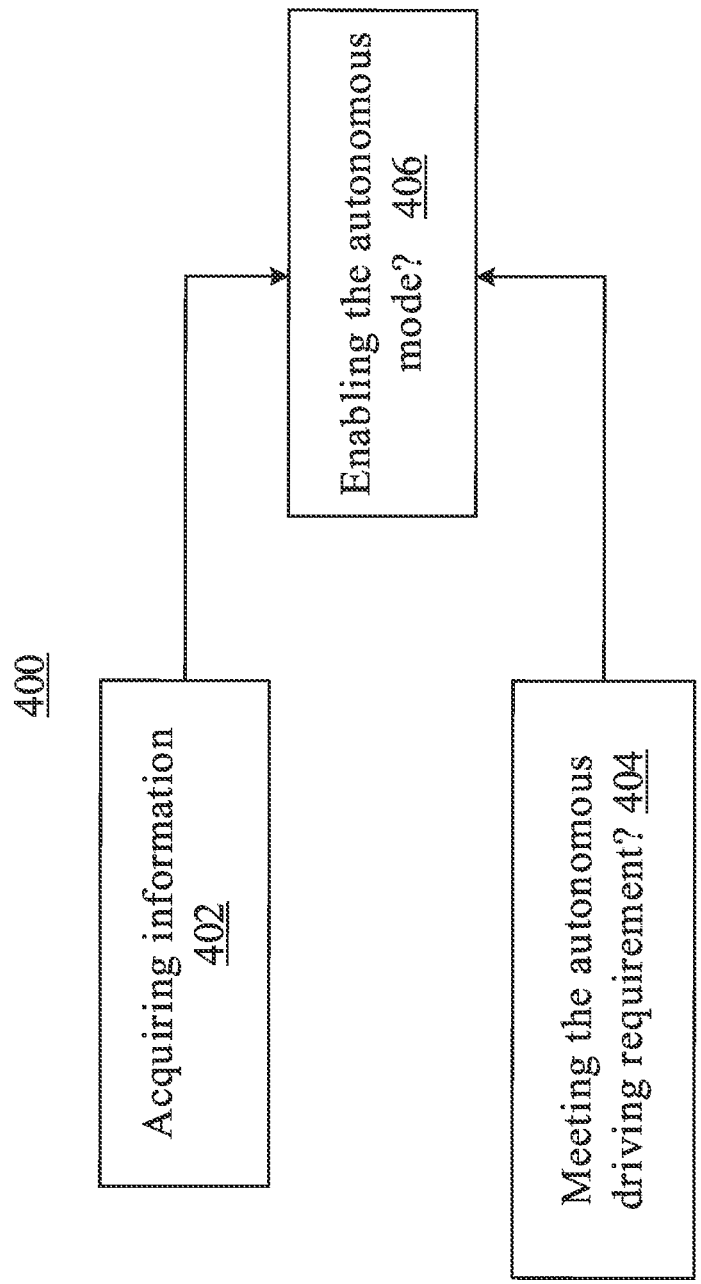
FIG. 4 illustrates a process of determining whether to enable an autonomous driving mode according to an embodiment of the present disclosure.

FIG. 4 illustrates a process 400 of determining whether to enable an autonomous driving mode according to an embodiment of the present disclosure. The process 400 may be performed in the driving assistance device 13, and thus the above described features of the driving assistance device 13 are applicable here.

As shown in FIG. 4, in block 402, the acquisition module 131 acquires information including traffic rules information as well as environment information and vehicle state information. The acquired information may include information received from the external device and detected by the in-vehicle sensor.

In block 404, the determining module 134 determines whether the current state of the vehicle 100 meets the autonomous driving requirement of the vehicle 100 based on the acquired information, and sends the determined result to the decision module 133.

In an example, the determining includes comparing the current state of the vehicle 100 with vehicle states that are not suitable for autonomous driving. If the current state of the vehicle 100 matches at least one of the vehicle states that are not suitable for autonomous driving, the determining module 134 determines the current state of the vehicle 100 does not meet the autonomous driving requirement. If the current state of the vehicle 100 does not match any of the vehicle states that are not suitable for autonomous driving, the determining module 134 determines the current state of the vehicle 100 meets the autonomous driving requirement. The vehicle states that are not suitable for autonomous driving may include: the vehicle door or the trunk cover being in an open state; the orientation of the vehicle head not being conforming with the driving direction guided by a navigation route; a failure of an in-vehicle sensor for autonomous driving being detected; a failure of the positioning function or navigation function being detected; and the current travelling area is not a legally allowed autonomous driving area.

In block 406, the decision module 133 makes a decision on whether to enable the autonomous driving of the vehicle 100 based on the determined result.

If the determined result is that the current state of the vehicle 100 meets the autonomous driving requirement, the decision module 133 makes a decision to enable the autonomous driving of the vehicle 100. Then, the driving assistance device 13 implements a driving assistance process 500 that will be described below.

If the determined result is that the current state of the vehicle 100 does not meet the autonomous driving requirement, the decision module 133 makes a decision to disable the autonomous driving of the vehicle 100. In this case, the driving assistance device 13 will provide a reminder to the driver of the vehicle 100 to adjust the state of the vehicle to meet the autonomous driving requirement. Then, the decision to enable the autonomous driving can be made.

Figure 5A:
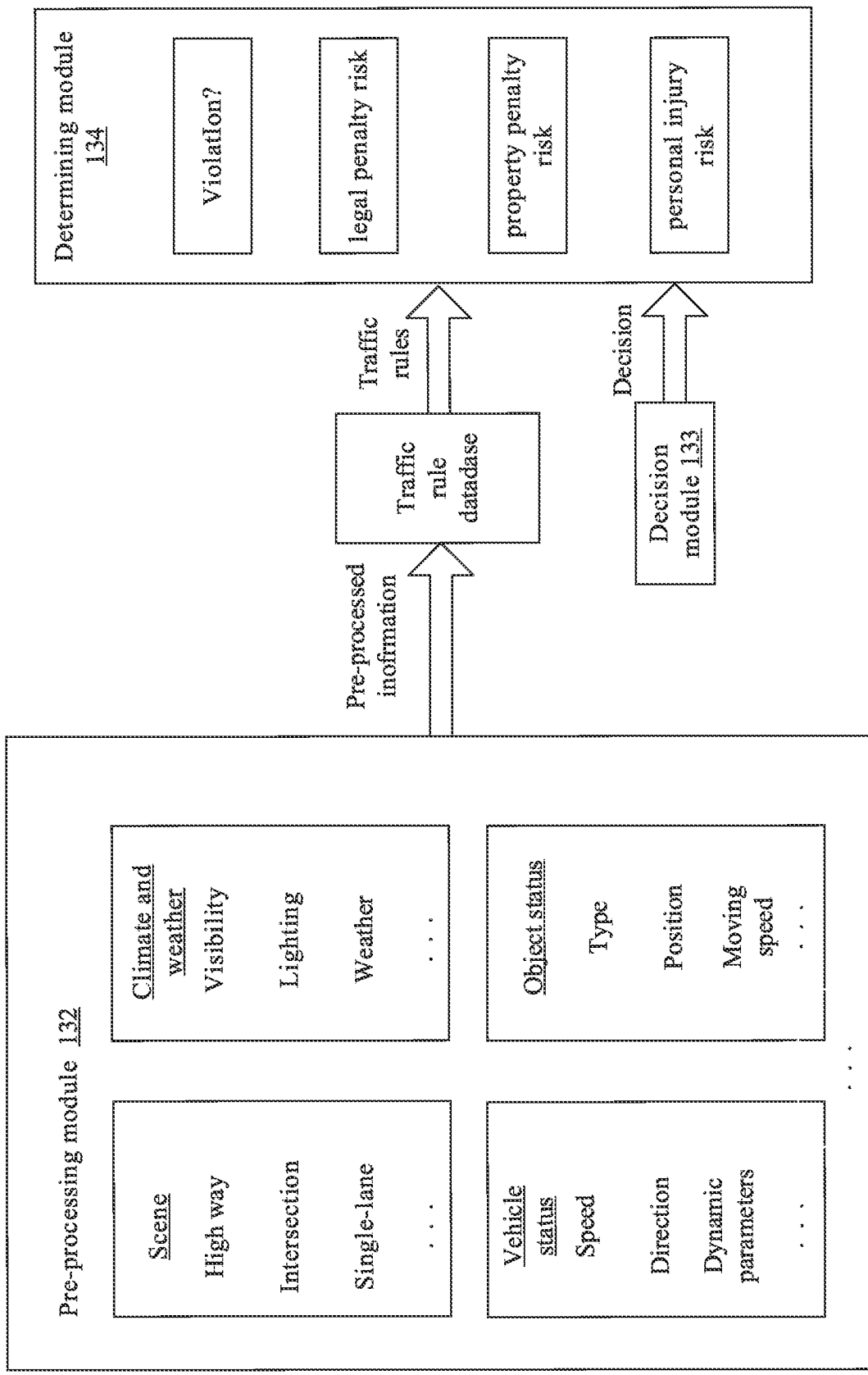
FIG. 5A schematically shows a working principle of the driving assistance device illustrated in FIG. 3.
Figure 5B:
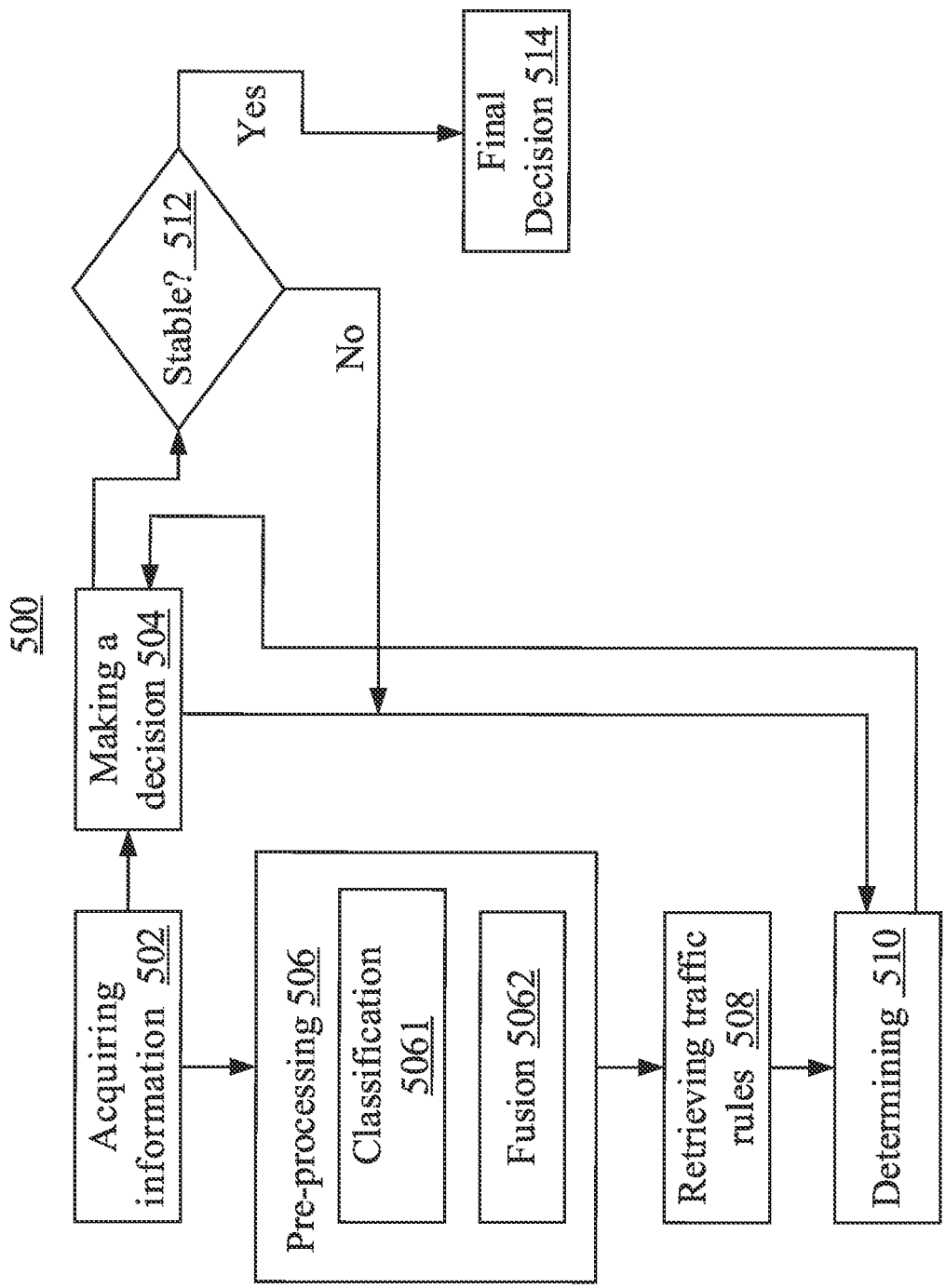
FIG. 5B shows a driving assistance process according to an embodiment of the disclosure.

FIG. 5A shows an exemplary working principle of the driving assistance device 13. FIG. 5B is a flowchart illustrating a driving assistance process 500 according to an example of the disclosure. The driving assistance process 500 may be performed in driving assistance device 13, and thus the above described features of the driving assistance device 13 are also applicable here. The driving assistance process 500 will be described with the reference to FIGS. 5A and 5B.

In block 502, similar to block 402, the acquisition module 131 acquires information including traffic rules information as well as environment information and vehicle state information. The acquired information may include information received from the external device and information detected by the in-vehicle sensor.

In block 504, the decision module 133 makes a decision on a driving behavior of the vehicle 100 based on its input. The decision on a driving behavior is the output of the decision module 133. The input of the decision module 133 includes the acquired information from the acquisition module 131 and the determination of the violation of the driving behavior from the determining module 134. The driving behavior may include various driving behavior of the vehicle 100 in the autonomous mode, such as left turning, accelerating, braking, etc.

In block 506, the pre-processing module 132 pre-processes the acquired information. The pre-processing may include processing the acquired information into certain information categories using a classification algorithm (block 5061) and performing a fusion calculation on the categorized acquired information (block 5062).

The pre-processing module 132 stores various predefined information categories. These information categories correlates, at least in part, to the labels/tags of the traffic rules (which corresponds to the category-based keywords as discussed above). The information categories are considered and referred to when generating the labels/tags. In this way, the efficiency of pre-processing can be improved because the processed information is interrelated. Examples of blocks 5061 and 5062 will be described.

In block 5061, the acquired information is processed using a classification algorithm to obtain one of the plurality of information categories.

Referring to FIG. 5A, in an example, the pre-defined information categories are stored in the pre-processing module 132, including a driving scene category, a weather condition and environment category, a vehicle state category and an object state category. One or more of the information categories may each include sub-categories. It is noted that the information categories and sub-categories shown in FIG. 5A are exemplary. According to examples of the disclosure, the information categories may include fewer or more categories, and the sub-categories may be classified in other ways.

In an example, the same type of information that is captured by different sensors (e.g. the communication interface and the in-vehicle sensor) is classified into the same respective one of the information categories. For example, if the acquired information includes the illumination intensity received via the communication interface and the illumination intensity sensed by the in-vehicle sensor, both of the intensities will be classified into the category of weather conditions and environments. In addition, if this category has a sub-category of illumination, both of the intensities will be classified into the sub-category of illumination.

In block 5062, a fusion calculation is performed on information acquired by different sensors that is classified into the same information category. For example, the fusion calculation is performed on both of the illumination intensities to obtain the fused intensity. Then, the fused intensity will be used as the information on illumination and be further processed in the driving assistance device 13.

It is advantageous to provide the plurality of categories of information in the driving assistance device 13 because the acquired information is classified into respective categories, and the subsequent information processing is performed with the classified information. In this way, a reduced set of information will be processed due to the redundancy in the acquired information being removed. With reduced set of information, the complexity of the subsequent information processing can be greatly reduced and the efficiency can be improved. For example, the determining is performed by the determining module 134 using the pre-processed information output from the pre-processing module 132, and thus the efficiency of the determining module 134 can be improved.

In block 508, the determining module 134 retrieves one or more traffic rules from the traffic rule database based on the pre-processed information.

In an example, the determining module 134 matches the pre-processed information with the pre-processed traffic rules to retrieve the one or more traffic rules. For example, the determining module 134 matches the information category and/or sub-category of the pre-processed information with the labels/tags of the processed traffic rules, and retrieves a traffic rule with a tag that matches the information category or sub-category of the pre-processed information. Taking the illumination intensity as an example, if the pre-processed information is classified into the sub-category of illumination, and the sub-category of illumination matches with the label of illumination, then one or more traffic rules having the label of illumination will be retrieved from the traffic rule database.

In another example, the determining module 134 retrieves the one or more traffic rules by means of a traffic rule model. The traffic rule model may be a trained neural network model. The pre-processed information (e.g., the classified information and the fused information) is input to the traffic rule model, and the traffic rule model outputs one or more traffic rules related to the input information.

It is seen that, upon pre-processing the acquired information and the traffic rules, the related one or more traffic rules can be retrieved quickly and accurately without traversing all the traffic rules in the traffic rule database, which greatly improves the operating efficiency of the determining module 134.

In block 510, the determining module 134 evaluates the driving behavior decided by the decision module 133 from three aspects, namely, the legal penalty risk, the property damages risk and the personal injury risk. The determining module 134 first determines whether the driving behavior violates at least one of the retrieved traffic rules. If the determining module 134 determines the driving behavior does not violate any of the retrieved traffic rules, a message that the driving behavior does not violate any of the traffic rules will be provided. If the determining module 134 determines the driving behavior violates at least one of the retrieved traffic rules, the determining module 134 judges the driving behavior from the three aspects as further described below.

For the first aspect, the determining module 134 determines the legal penalty risk of the driving behavior based on the retrieved traffic rules. The legal penalty risk may be expressed in terms of the degree of legal responsibility corresponding to at least one of the retrieved traffic rules that the driving behavior violates.

In an example, the degree of legal responsibility is expressed by a percentage of fault between 0% and 100%. The percentage of 100% means a full responsibility and complete fault. The percentage of 0% means no responsibility and no fault. The percentage of 50% means half responsibility and half fault.

In another example, the degree of legal responsibility is expressed by several levels (e.g., levels 1~n, n being a natural number greater than 1). The level varies as the legal responsibility of the vehicle 100 for the driving behavior changes. For clarity, an example of levels 1-7 is described. In this example, In an example, levels 1-7 are preset, level 1 represents a full responsibility; level 2 represents a 80%-100% responsibility; level 3 represents a 60%-80% responsibility; level 4 represents a 40%-60% responsibility; level 5 represents a 20%-40% responsibility; level 6 a 0%-20% responsibility; and level 7 represents no responsibility.

For the second aspect, the determining module 134 determines the property damages risk of the driving behavior based on the retrieved traffic rules. The property damages risk may be expressed in terms of the amount of the fine and payment corresponding to the violation of at least one of the retrieved traffic rules that caused by the driving behavior.

In an example, the property damages risk may be expressed by several levels (e.g., levels 1~m, m being a natural number greater than 1). For example, level 1 represents the maximum amount of the fine and payment, and level m represents the minimum amount of the fine and payment. The larger the number of the level is, the less amount of the fine and payment is needed.

It is noted that the range of the fine and payment may be referred to the range of the fine and payment regulated by a special traffic rule or the range of the fine pre-stored in the traffic rule database and which may also relate to the type of object the autonomous vehicle may be collide with (e.g. a premium luxury brand passenger vehicle or a low-end passenger vehicle; a curb or a large billboard).

For the third aspect, the decision module 134 determines (predicts) the personal injury risk of the driving behavior based on the retrieved traffic rules. The personal injury risk may be expressed in terms of the degree of personal injury caused by the driving behavior of the vehicle 100. The degree of personal injury may be calculated based on predicted injuries and possible casualties. For example, if the vehicle 100 will collide with a pedestrian with a speed of 40 km/h under the decided vehicle behavior, personal injury risk will be calculated by means of predicting the extent of the personal injuries of the pedestrian in this case.

In an example, the personal injury risk may be expressed by several levels of severity (e.g., levels 1-t, t being a natural number greater than 1). The level varies as the severity degree of personal injury that is caused by driving behavior changes. For example, level 1 represents the most severe personal injury and level t represents n the least severe personal injury.

A few examples of determinations made by the determining module 134 in different scenarios are further illustrated in Table 1 below. As shown the degree of personal injury is described by levels 1-5 with level 1 representing the most serious injury and level 5 representing no injury. The degree of property damages is described by levels 1-5 with level 1 representing the upper limit of the fine and payment and level 5 representing the lower limit of the fine and payment. The legality refers to whether the driving behavior of the vehicle 100 complies with the retrieved traffic rules, wherein "Yes" indicates the driving behavior of the vehicle 100 complies with the retrieved traffic rules, and "No" indicates the driving behavior of the vehicle 100 does not comply with at least one of the retrieved traffic rules.

TABLE 1

Examples of the determinations

| | Pre-processed information | Decided driving behavior | Legality | Degree of legal responsibility | Degree of personal injury | Degree of property damages |
|---|---|---|---|---|---|---|
| E_1 | Scene: highway<br>Weather and climate: visibility <300 m<br>Vehicle state: 100 km/h, below the speed limit<br>Object State: a pedestrian in front is crossing the driving lane of the vehicle | Emergency braking<br>Collision with the pedestrian | No | The host vehicle: 30%<br>The pedestrian: 70% | Level 1 | Level 1 |
| E_2 | Scene: highway<br>Weather and climate: visibility <300 m<br>Vehicle state: 100 km/h, below the speed limit<br>Object state: a truck on a reverse lane, 80 km/h, below the speed limit | Emergency braking<br>Change to the reverse lane<br>Collision with the truck | No | The host vehicle: 100%<br>The trunk: 0% | Level 1 | Level 1 |
| E_3 | Scene: highway<br>Weather and climate: visibility <300 m<br>Vehicle state: 100 km/h, below the speed limit<br>Object state: wall on the right | Emergency braking<br>Turn to the right<br>Crash into the wall with a collision angle of 45 degrees | No | The host vehicle: 100%<br>The object: 0% | Level 3 | Level 3 |
| E_4 | Scene: urban road<br>Weather and climate: visibility <500 m<br>Vehicle state: below the speed limit<br>Object State: a pedestrian in front is crossing the driving lane of the vehicle | Crossing the solid line to the bus lane on the right<br>No collision | No | The host vehicle: 100%<br>The object: 0% | Level 5 | Level 3 |
| E_5 | Scene: urban road<br>Weather and climate: visibility <500 m<br>Vehicle state: below the speed limit<br>Object State: a pedestrian in front is crossing the driving lane of the vehicle | Cross a solid double line to a reverse lane on the left<br>No collision | No | The host vehicle: 100%<br>The object: 0% | Level 5 | Level 2 |

After determining the legal penalty risk, the property damages risk and the personal injury risk, the determining module 134 outputs the determined results to the decision module 133.

Then, a closed-loop control is performed by the decision module 133 and the determining module 134. The determined risks are used as feedback parameters in the closed-loop control, and the closed-loop control is completed when the decision on the driving behavior does not change, that is, the output of the decision module 133 is stable. In a simplified example, the closed-loop control includes cyclically performing the following steps (a) and (b) until the output of the decision module does not change as further explained below.

In step (a), upon a first (or a preset) driving behavior being input into the determining module 134, the determining module 134 outputs the determined risks of said first driving behavior to the decision module 133. In step (b), the decision module 133 decides a new driving behavior attempting to reduce the risks, and outputs the second driving behavior to the determining module 134 such that the determining module 134 determines risks on legal penalty, property damages and personal injury of the second driving behavior. If the determined risks of the second driving behavior are lower than the first driving behavior, said lower risks will be fed to the decision module 133 and trigger the decision module 133 to decide the third driving behavior attempting to further reduce the risks of the second decision. If the determined risks of the second driving behavior are higher than the first driving behavior, the decision module 133 will decide a third behavior and output said the third behavior to the determining module 134. The determining module 134 will determine the risks of said third behavior and compare the risks of said third behavior with the risk of the first behavior. If the risks of the third behavior are lower than the first behavior, the determining loop will decide a fourth behavior attempting to further reduce the risks of the third behavior. If the risks of the third behavior are higher than the first behavior, the determining loop will decide a fourth behavior attempting to further reduce the risks of the first behavior. The loop will continue until the decided risks of the new driving behavior could not be further lowered as compared to the lowest risks so far. For example, if the calculated risks in n consecutive cycles (n can be predefined, or determined by the decision module in each specific case) are all higher than the lowest risks so far (the baseline), the decision module reverts to the driving behavior with the lowest risks. At that time, the decision module 133 will revert to the previous decision of the driving behavior with the lowest risks. The loop will end and the decision module 133 outputs a stable decision.

In an example, the determining module 134 calculates a consolidated risk score for a decided driving behavior based on the determined risks. The consolidated risk score is a quantization parameter indicating a consolidated risk of a decided driving behavior. In an embodiment, after determining risks on different aspects including the abovementioned three aspects (legal penalty, property damages and personal injury caused by a driving behavior) and converting all these determined risks into values in the same variable scale (such as numbers within 0-10 or levels in 1-7), the determining module 134 calculates a weighted average of the determined risks on these aspects as the consolidated risk score. This is particularly useful when some aspects are considered more important than other aspect in determining the overall and consolidated risk of a decided driving behavior. For example, the personal injury risk would be considered more important than the legal penalty and the property damages in assessing the overall risks of a driving behavior, the personal injury risk will be assigned more weight than the legal penalty and the property damages, and contribute more to the final average.

In other words, the closed-loop control includes circularly carrying out blocks 504 and 510 with the determined risks or the consolidated risk score as the feedback parameter as illustrated above. It is noted that the inputs to the decision module include the determinations from the determining module as well as the information from the acquisition module.

An example of the closed-loop control will be described using examples 1-3 in Table 1.

Referring to Table 1, the scene and the weather in each of examples 1-3 are the same. In a first cycle (example 1), the decision module makes a first decision of emergency braking, which will result in collision with the pedestrian. The first decision is output to the determining module 134. The determining module 134 determines the legality (illegal), the degree of legal responsibility (30% fault), the degree of personal injury (level 1) and the degree of property damages (level 1) for the first decision. The determined results are output to the decision module 133. In a second cycle of example 2, the decision module 133 makes a second decision attempting to reduce the risks for emergency braking and changing to the reverse lane, which will result in collision with the truck. The second decision is output to the determining module 134. The determining module 134 determines the legality (illegal), the degree of legal responsibility (100%), the degree of personal injury (level 1) and the degree of property damages (level 1) for the second decision. The determined risks which are higher than the risks of cycle 1, are output to the decision module 133. In a third cycle of example 3, the decision module 133 makes a third decision attempting to reduce the risks using the risks of cycle 1 as the baseline (as risks of cycle 2 are higher than cycle 1) for emergency braking and turning to the right, which will result in crashing into the wall with a collision angle of 45 degrees. The third decision is output to the determining module 134. The determining module determines the legality (illegal), the degree of legal responsibility (100%), the degree of personal injury (level 3) and the degree of property damages (level 3) for the third decision. The determined risks are lower than the risks of cycle 1 and are output to the decision module 133. In this specific scene, the decision module 133 decides there is no other different driving behavior options available, the decision module makes a fourth decision, which is the same as the third decision and thus outputs a stable decision and ends the loop. Assuming there are additional driving decision options are available, the decision module 133 will makes a number of new decisions (not shown) and the determining module 134 will calculate the risks thereof (not shown). When the risks of these new decisions are all higher than the risks of cycle 3, the decision module 133 then reverts to the third decision and outputs the third decision as the stable decision. The closed-loop will end then. It is seen that the closed-loop control is advantageous because both the personal injury and the property damages are reduced through the cycles. To be more specific, both the degree of personal injury and the degree of property damages are decreased to Level 3 (a better level) from Level 1 (a worst level).

The determining of whether a stable decision is output is performed in decision block 133 (block 512). In an example, in the case that the driving scene stays the same, the determining module determines whether the risks of the present driving decision are higher than the lowest risks so far (the baseline). If the calculated risks in n consecutive cycles (n can be predefined, or determined by the decision module in each specific case) are all higher than the baseline, the decision module reverts to the driving behavior with the lowest risks, determines that a stable decision can now be output, and outputs the stable decision as the final decision. The loop can then be completed.

In another embodiment of the closed-loop control, the determining module 134 is set to compare the determined risks of the current cycle with the determined risks of the last cycle, rather than the cycle that has the lowest determined risks so far. For example, the determining module 134 compares the determined risks of the fourth cycle with that of the third cycle even though the risks of the second cycle are lower than the third cycle. In this example, blocks 504 and 510 are circularly carried out for a pre-determined number of consecutive cycles until the output of the decision module 133 does not change. Then, the decision module 133 outputs the stable decision as the final decision.

It is noted that, in the case that a stable decision is output, a closed-loop system including the decision module and the decision module is in a stable state.

It is noted that, in one closed-loop, elements in the scene (e.g. the vehicle state and the object state) may dynamically change; however, the scene can be understood as being unchanged in terms of the traffic rules. In other words, a slight change in the scene will not change the scene defined by controlling traffic rules. For example, referring to FIG. 1A, the following scenario can be seen as being the same scene: the pedestrian moves with a speed of 1 meter/second without changing the lane. Referring to FIG. 1B, the following scenarios can be seen as the same scene: the bicycle or the bus traveling in a neighboring lane slightly moves; however this movement cannot provide sufficient space for the vehicle V to avoid the collision and the vehicle V still face the above three options.

It is noted that the stable decision means the decided driving behavior does not change; however, the decided driving behavior can be achieved by different vehicle maneuvers. For example, in a closed-loop of about one millisecond, the stable (final) decision is to change to the left lane. For achieving this final decision, the vehicle may turn to the left with 10 degrees or turn to the left with 11 degrees.

In an example of the disclosure, the time period during which the decision module and the determining module perform one closed-loop control is in the order of milliseconds. In such a short time period, the elements in the scene are considered unchanged. For example, the vehicle state and the object state do not change. In other words, the closed-loop system including the decision module and the determining module becomes stable before the scene changes.

According to examples of the disclosure, the decision on the driving behavior is made based on the aspects that can be measured, i.e., risks on legal penalty, property damages and personal injury of the driving behavior. In this way, the risk of the driving behavior can be decreased to the minimum level.

According to examples of the disclosure, the closed-loop control is performed so as to generate an optimal decision for the vehicle efficiently.

According to examples of the disclosure, the closed-loop control is performed using the pre-processed information that is interrelated. In this way, the closed-loop control can be performed with efficiency.

Figure 6:
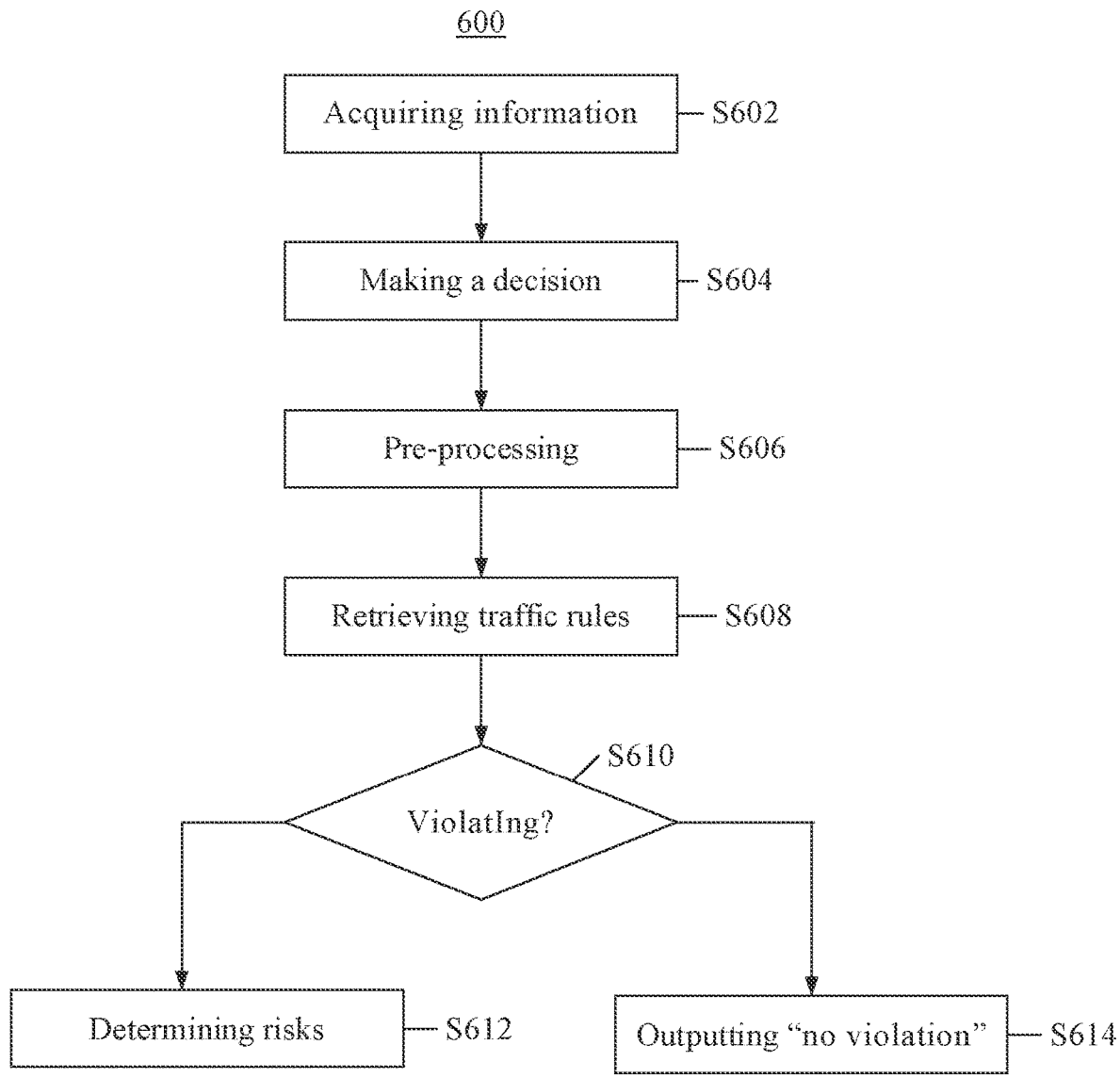
FIG. 6 is a flowchart of a driving assistance method according to an embodiment of the disclosure.

FIG. 6 illustrates a driving assistance method 600 according to an embodiment of the disclosure. The method 600 may be executed in the driving assistance device 13 or the driving assistance system 10. Therefore, the above descriptions about the driving assistance device 13 and the driving assistance system 10 are also applicable here.

Referring to FIG. 6, in step 602, vehicle state information and environment information are acquired.

In step 604, a decision on a driving behavior is made for the vehicle in an autonomous driving mode based on the acquired information.

In step 606, the acquired information is processed to identify one of a plurality of pre-defined information categories the acquired information belongs to.

In step 608, one or more traffic rules related to the information category the acquired information belongs to are retrieved from a traffic rule database pre-stored in the driving assistance device.

In step 610, a determination of whether the driving behavior violates any of the retrieved traffic rules is made.

If it is determined the driving behavior violates at least one of the retrieved traffic rules, the method proceeds to step 612. In step 612, risks on legal penalty, property damages and personal injury of the driving behavior are determined as described above and a close loop is run to determine the optimized driving decision based on the determined risks as described above.

If it is determined the driving behavior does not violate any of the retrieved traffic rules, the method proceeds to step 614. In step 614, a message of "no violation" is output.

The disclosure provides a non-transitory computer-readable medium with instructions stored therein which, when executed, causes a processor to carry out the steps of the driving assistance method 600 described above.

It is noted that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

The invention claimed is:

1. A driving assistance device for a vehicle, comprising:
an acquisition module configured to acquire information comprising at least one of vehicle state information and environment information surrounding the vehicle obtained through a vehicle bus from an on-board sensing unit comprising one or more of a camera sensor, a radar sensor, a lidar, an ultrasonic sensor, a wheel speed sensor, a displacement sensor, an acceleration sensor, and a steering angle sensor arranged on a body of the vehicle;
a decision module configured to determine a driving behavior for the vehicle in an autonomous driving mode based on the acquired information;
a pre-processing module configured to process the acquired information to identify a respective information category among a plurality of pre-defined information categories the acquired information belongs to; and
a determining module configured to retrieve one or more traffic rules related to the information category that the acquired information belongs to from a traffic rule database pre-stored in the driving assistance device; determine that the driving behavior violates any of the one or more traffic rules; and determine risks of the driving behavior after determining that the driving behavior violates at least one of the one or more traffic rules, the risks comprising a legal penalty, property damages and personal injury caused by the driving behavior, wherein the risks are converted into values in a same variable scale and a consolidated risk score is obtained for the driving behavior by calculating a weighted average of the risks;
wherein the decision module and the determining module are configured to perform a closed-loop control of the autonomous driving mode with the consolidated risk score of the determined risks as a feedback parameter, and the closed-loop control is ended when the decision module outputs a stable decision such that the determined risks of the driving behavior could not be further lowered, and the stable decision means that the determined driving behavior does not change; and
wherein the closed-loop control includes steps (a) and (b) performed sequentially, the steps being repeated until the decision module outputs the stable decision:
in step (a), the determining module outputs the determined risks of the driving behavior to the decision module; and
in step (b), the decision module determines a new driving behavior attempting to reduce the determined risks, and outputs the decision on the new driving behavior to the determining module.

2. The driving assistance device according to claim 1, wherein the one or more traffic rules in the traffic rule database are pre-processed to include at least one of:
labels indicative of one or more of vehicle states, scenes, weather, object states, and penalty criterion;
combinations of driving behaviors with surroundings of the vehicle including driving scenes, weather or climate and object states; and
a pair of condition element and result element, the condition element comprising at least one driving behavior and a scene in which the driving behavior occurs, and the result element comprising a penalty criterion associated with the driving behavior.

3. The driving assistance device according to claim 2, wherein the labels at least partially correspond to the pre-defined information categories, and
wherein the determining module is configured to retrieve the one or more traffic rules with the labels that match the information category the acquired information belongs to.

4. The driving assistance device according to claim 2, wherein the combinations at least partially correspond to the pre-defined information categories, and
wherein the determining module is configured to retrieve the one or more traffic rules with the combinations that match the information category the acquired information belongs to.

5. The driving assistance device according to claim 1, wherein the determining module is configured to retrieve the one or more traffic rules using a traffic rule model; and
wherein the pre-processed information is an input to the traffic rule model, and the one or more traffic rules are output from the traffic rule model.

6. The driving assistance device according to claim 1, wherein the pre-defined information categories include at least one of a driving scene category, a weather and environment category, a vehicle state category and an object state category, and
wherein one or more of the pre-defined information categories comprise sub-categories.

7. The driving assistance device according to claim 1, wherein the traffic rule database comprises one or more of:
one or more static traffic rules associated with the vehicle's location;
one or more dynamic traffic rules that are updated over time; and
one or more temporary traffic rules detected by at least one of an on-board sensor and a road-side sensor, said temporary traffic rules are inconsistent with or absent from the static traffic rules.

8. The driving assistance device according to claim 1, wherein the pre-processing module is configured to:
identify acquired information received from different sensors that belong to the same one of the plurality of pre-defined information categories; and
perform a fusion calculation of the identified information and output the fused information to the determining module, the determined risks being based on the fused information.

9. The driving assistance device according to claim 1, wherein said legal penalty comprising a degree of legal responsibility for violating at least one of the one or more traffic rules, said degree of legal responsibility is expressed as a percentage between 0% and 100% of fault or as a severity level of fault or continuous values in an adjustable range.

10. The driving assistance device according to claim 1, wherein said property damages for violating the at least one of the one or more traffic rules are expressed as a severity level based on the amount of the property damages caused by the violation.

11. The driving assistance device according to claim 1, wherein said personal injury is expressed as a severity level based on predicted injuries and related casualties caused by the violation.

12. The driving assistance device according to claim 1, wherein the decision module is further configured to: enable the autonomous driving mode based on the acquired information if the vehicle meets autonomous driving requirements, and enable the closed-loop control; and disable the autonomous driving mode if the vehicle does not meet the autonomous driving requirements, and disable the closed-loop control.

13. A vehicle, comprising:
a communication interface configured to receive information on the vehicle's states, environmental conditions and traffic rules from an external device;
an on-board sensing unit for capturing information on the vehicle's surroundings and states, wherein the on-board sensing unit comprises one or more of a camera sensor, a radar sensor, a lidar, an ultrasonic sensor, a wheel speed sensor, a displacement sensor, an acceleration sensor, and a steering angle sensor arranged on a body of the vehicle; and
a driving assistance device in communication with the communication interface and the on-board sensing unit through a vehicle bus, the driving assistance device comprising:
an acquisition module configured to acquire information from the communication interface and the on-board sensing unit;
a decision module configured to determine a driving behavior for the vehicle in an autonomous driving mode based on the acquired information;
a pre-processing module configured to process the acquired information to identify a respective information category among a plurality of pre-defined information categories the acquired information belongs to; and
a determining module configured to retrieve one or more traffic rules related to the information category that the acquired information belongs to from a traffic rule database pre-stored in the driving assistance device; determine that the driving behavior violates any of the one or more traffic rules; and determine risks of the driving behavior after determining that the driving behavior violates at least one of the one or more traffic rules, the risks comprising a legal penalty, property damages and personal injury caused by the driving behavior, wherein the risks are converted into values in a same variable scale and a consolidated risk score is obtained for the driving behavior by calculating a weighted average of the risks;
wherein the decision module and the determining module are configured to perform a closed-loop control of the autonomous driving mode with the consolidated risk score of the determined risks as a feedback parameter, and the closed-loop control is ended when the decision module outputs a stable decision such that the determined risks of the driving behavior could not be further lowered, and the stable decision means that the determined driving behavior does not change; and
wherein the closed-loop control includes steps (a) and (b) performed sequentially, the steps being repeated until the decision module outputs the stable decision:
in step (a), the determining module outputs the determined risks of the driving behavior to the decision module; and
in step (b), the decision module determines a new driving behavior attempting to reduce the determined risks, and outputs the decision on the new driving behavior to the determining module.

14. A driving assistance method for a vehicle, comprising the steps of: acquiring information including at least one of vehicle state information and environment information surrounding the vehicle obtained through a vehicle bus from an on-board sensing unit comprising one or more of a camera sensor, a radar sensor, a lidar, an ultrasonic sensor, a wheel speed sensor, a displacement sensor, an acceleration sensor, and a steering angle sensor arranged on a body of the vehicle; determining a driving behavior for the vehicle in an autonomous driving mode based on the acquired information; processing the acquired information to obtain a respective information category among a plurality of pre-defined information categories the acquired information belongs to; retrieving one or more traffic rules related to the information category that the acquired information belongs to from a traffic rule database pre-stored in the driving assistance device; determining that the driving behavior violates any of the one or more traffic rules; and determining risks of the driving behavior after determining that the driving behavior violates at least one of the one or more traffic rules, the risks comprising a legal penalty, property damages and personal injury caused by the driving behavior, wherein the risks are converted into values in a same variable scale and a consolidated risk score is obtained for the driving behavior by calculating a weighted average of the risks; wherein the method further comprises a step of performing a closed-loop control of the autonomous driving mode with the consolidated risk score of the determined risks as a feedback parameter, and the closed-loop control is ended when the decision module outputs a stable decision such that the determined risks of the driving behavior could not be further lowered, and the stable decision means that the determined driving behavior does not change; and wherein the closed-loop control includes steps (a) and (b) performed sequentially, the steps being repeated until the decision module outputs the stable decision: in step (a), the determining module outputs the determined risks of the driving behavior to the decision module; and in step (b), the decision module determines a new driving behavior attempting to reduce the determined risks, and outputs the decision on the new driving behavior to the determining module.

15. A non-transitory computer-readable medium with instructions stored therein which, when executed, cause one or more processors to carry out the steps comprising:
acquiring information including at least one of vehicle state information and environment information surrounding the vehicle obtained through a vehicle bus from an on-board sensing unit comprising one or more of a camera sensor, a radar sensor, a lidar, an ultrasonic sensor, a wheel speed sensor, a displacement sensor, an acceleration sensor, and a steering angle sensor arranged on a body of the vehicle;

determining a driving behavior for the vehicle in an autonomous driving mode based on the acquired information;

processing the acquired information to obtain a respective information category among a plurality of pre-defined information categories the acquired information belongs to;

retrieving one or more traffic rules related to the information category that the acquired information belongs to from a traffic rule database pre-stored in the driving assistance device;

determining that the driving behavior violates any of the one or more traffic rules; and determining risks of the driving behavior after determining that the driving behavior violates at least one of the one or more traffic rules, the risks comprising a legal penalty, property damages and personal injury caused by the driving behavior, wherein the risks are converted into values in a same variable scale and a consolidated risk score is obtained for the driving behavior by calculating a weighted average of the risks;

wherein the steps further comprise performing a closed-loop control of the autonomous driving mode with the consolidated risk score of the determined risks as a feedback parameter, and the closed-loop control is ended when the decision module outputs a stable decision such that the determined risks of the driving behavior could not be further lowered, and the stable decision means that the determined driving behavior does not change; and wherein the closed-loop control includes steps (a) and (b) performed sequentially, the steps being repeated until the decision module outputs the stable decision:

in step (a), the determining module outputs the determined risks of the driving behavior to the decision module; and in step (b), the decision module determines a new driving behavior attempting to reduce the determined risks, and outputs the decision on the new driving behavior to the determining module.

\* \* \* \* \*